United States Patent [19]

Sallay

[11] Patent Number: 4,504,546

[45] Date of Patent: Mar. 12, 1985

[54] METHOD FOR FLAME RETARDING MATERIAL WITH AMMONIUMTRIBORATE

[76] Inventor: Stephen I. Sallay, 2918 Glencairn Dr., Fort Wayne, Ind. 46815

[21] Appl. No.: 429,133

[22] Filed: Sep. 30, 1982

Related U.S. Application Data

[60] Division of Ser. No. 286,042, Jul. 22, 1981, Pat. No. 4,382,025, which is a continuation-in-part of Ser. No. 135,177, Mar. 28, 1980, abandoned, which is a continuation-in-part of Ser. No. 927,340, Jul. 24, 1978, Pat. No. 4,196,177.

[51] Int. Cl.$^3$ .................................................. D02G 3/00
[52] U.S. Cl. ............................ 428/375; 427/372.2; 427/427; 427/430.1; 427/439; 428/393; 428/394; 428/395; 428/921
[58] Field of Search .............. 427/372.2, DIG. 10, 427/322, 440, 324, 325, 326, 444, 430.1, 439, 393.3, 421, 427; 428/921, 393, 375, 394, 395; 252/601, 607, 608; 106/15.05, 18.13, 18.32

[56] References Cited

U.S. PATENT DOCUMENTS

| | | | |
|---|---|---|---|
| 641,801 | 1/1900 | Schroeter | 252/608 |
| 646,101 | 1/1900 | Simpson | 427/325 |
| 3,378,381 | 4/1968 | Draganov | 252/607 |
| 3,438,847 | 4/1969 | Chase | 428/921 |
| 3,819,517 | 6/1974 | Cavazos et al. | 427/DIG. 10 |
| 4,012,507 | 3/1977 | Knoepfler et al. | 428/921 |

OTHER PUBLICATIONS

Knoepfler et al., Chem. Abs., vol. 82, p. 86, 44841x, 1975.
Kimura, Chem. Abs., vol. 84, 151530h, 1976.

*Primary Examiner*—S. L. Childs
*Attorney, Agent, or Firm*—Bacon & Thomas

[57] ABSTRACT

Combustible materials such as fiber is made flame retardant by treating the material with a methanol or water solution containing the newly discovered compound ammoniumtriborate ($NH_4 \cdot B_3O_5 \cdot 3CH_3-OH$) or a methanolic solution of newly discovered methylborate ammonia adduct. These new flame retardants have the ability to penetrate the combustible material when applied as a solution and thereafter be converted in situ to ammoniumpentaborate to result in enhanced flame retardation over that achieved by merely the direct treatment with ammoniumpentaborate with other borate flame retardants.

13 Claims, No Drawings

METHOD FOR FLAME RETARDING MATERIAL WITH AMMONIUMTRIBORATE

CROSS-REFERENCE TO RELATED APPLICATIONS

This application is a division of application Ser. No. 286,042, filed on July 22, 1981, and entitled "Ammoniumtriborate, An Effective New Flame Retardant", which is now U.S. Pat. No. 4,382,025, which patent is a continuation-in-part of co-pending application, Ser. No. 135,177, filed on Mar. 28, 1980, and entitled "Preparation of Flame Retardant Ammoniumborate Compositions," which is now abandoned, which application is a continuation-in-part of application, Ser. No. 927,340, filed on July 24, 1978, now U.S. Pat. No. 4,196,177.

BACKGROUND OF THE INVENTION

Among the naturally occurring tetraborate ores, relatively few are ubiquitous, thus commercially valuable. As examples, there may be mentioned tincal or borax ($Na_2B_4O_7.10H_2O$), kernite or rasorite ($Na_2B_4O_7.4H_2O$), tincalconite ($Na_2B_4O_7.5H_2O$), and the most common refined tetraborates, such as borax pentahydrate ($Na_2B_4O_7.5H_2O$) and anhydrous borax ($Na_2B_4O_7$). These are given as illustrative examples of boron-containing minerals which may be employed in the practice of the present invention, but it is to be understood that the invention is in no way intended to be limited thereto. In fact, this invention is quite versatile and is designed to utilize any of the tetraborate ores and refined tetraborates for manufacturing ammoniumtriborate and ammoniumpentaborate.

If the tetraborate ore is calcined to render it anhydrous prior to treatment, methylborate-ammonia adduct $[(CH_3O)_3B.NH_3]$ is produced which can be further processed into ammoniumpentaborate, as described in my co-pending application, Ser. No. 135,177, filed Mar. 28, 1980, and in my U.S. Pat. No. 4,196,177, issued Apr. 1, 1980.

A quantitative esterification of boric acid to methylborate in the presence of sulfuric acid has been earlier demonstrated by H. I. Schlesinger, H. C. Brown, D. L. Mayfield and J. R. Gilbreath, J. Am. Chem. Soc., 75, 213–215 (1953). Several patents dealt with the recovery of boron content from ores through the formation and distillation of the volatile methylborate (R. P. Calvert et al, U.S. Pat. No. 1,308,577, 1919; F. H. May et al, U.S Pat. No. 2,833,623, 1958).

Addition compounds between methylborate, ammonia and amines have been described by Goubeau et al, (Z. anorg. u. allgem. Chem. 266, 27–37, 1951; ibid, 266, 161–174, 1951). H. A. Lehmann and W. Schmidt (Z. Chem. 5, 65–66 and 111, 1965) have described ammoniumpentaborate formation from boric acid and ammonia in polar solvents. But, the methylborate-ammonia adduct has not been prepared directly from alkali metal borates, such as tincal (borax) or other tetraborate ores.

As is also mentioned above, the commercially important ammonium pentaborate can be produced in accordance with the present invention. Ammoniumpentaborate was previously manufactured exclusively from the less abundantly occurring alkaline earth pentaborates, such as colemanite, Gerstley borate (e.g., U.S. Pat. No. 3,103,412; Swiss Pat. No. 354,760; Belgian Pat. No. 631,217; Italian Pat. No. 794,945) and potassiumpentaborate (e.g., U.S. Pat. No. 2,948,592). Transformation of borax to ammoniumpentaborate in dilute (10%) aqueous ammoniumchloride solution at 100° C. was earlier reported (U.S. Pat. No. 2,867,502; Ch. O. Wilson et al, Advances in Chem., Serial No. 32, 20-26, 1961). In these processes, the separation of sodiumchloride and ammoniumpentaborate was cumbersome. Most importantly, the distillation of a large volume of water from the pentaborate required high energy. As will subsequently be described, the process according to the present invention, which uses different reagents and solvent, requires significantly lower energy.

As a sole product, ammoniumtetraborate (biborate of ammonia) was obtained from alkali metal or alkaline earth metal borate ores upon the treatment of their water suspension with ammoniumcarbonate, ammoniumhydrocarbonate, ammoniumsulfite or ammoniumbisulfite (Ch. Masson et al, Brit. Pat. No. 10,361, 1897). But, in the absence of methanol, no ammoniumtriborate ($NH_4.B_3O_5.3CH_3$—OH) could be formed.

SUMMARY OF THE INVENTION

As a result of my continuing research, I discovered that tetraborate ores, ammonia and sulfurdioxide (or ammoniumsulfite) in methanolic suspension produces ammoniumtetraborate which is spontaneously transformed into ammoniumtriborate. As a by-product, methylborate-ammonia adduct is also formed. In the presence of water, both of these products can also be rearranged into ammoniumpentaborate.

This new technology opens the way for manufacturing valuable fire retardants such as ammoniumtriborate, ammoniumpentaborate and the mixture thereof from the most commonly occurring, least expensive borate ores, such as tincal (borax), kernite, tincalconite, ulexite and from refined borates, such as borax pentahydrate and borax tetrahydrate.

Following our technology, the crystal structure of borax is transformed into ammoniumtriborate, which upon the reaction with water, stabilizes in the form of ammoniumpentaborate. In order to understand the chemistry of this structural change, one should refer to the publications of C. L. Christ et al (Acta Cryst., 9, 830, 1956; ibid, 10, 776, 1957; 11, 761, 1958; 12, 162, 1959) and J. Krogh-Moe (Arkiv Kemi, 14, 439, 1959). These authors have shown that the familiar chemical formula of borax ($Na_2B_4O_7.10H_2O$) needs to be revised. Their X-ray crystallographic studies revealed that borax is composed of crystal units consisting of two planar $BO_3$ groups and two tetrahedral $BO_4^-$ ions and that the crystal lattice of borax corresponds to $Na_2[B_4O_5(OH)_4.8H_2O]$. The crystal matrix of borax consists of infinite cation-water complexes $[Na(H_2O)_4]_n{}^{n-1}$, formed from octahedral $Na(H_2O)_6$ groups, sharing edges of complex ions $B_4O_5(OH)_4{}^{2-}$. Similar crystallographic arrangement exists in ammoniumtetraborate as well.

Furthermore, three-dimensional framework ions occur in the pentaborate structures. The complex ion arises by joining rings into helices and the crystal is built by two identical interpenetrating framework $B_5O_8{}^-$-ions. These ions consist of four planar $BO_3$ groups and one tetrahedral $BO_4{}^-$-ion. The facile transformation of tetraborate ores through ammoniumtriborate into ammoniumpentaborate structure in accordance with the present invention changes the planar $BO_3$ group and tetrahedral $BO_4{}^-$-ion ratio from 1:1 (tetraborate) to 1:2 (triborate) and finally to 1:4 (pentaborate). This tendency toward stabilization seems to be a major driving force of the chemical transformation which takes place in the practice of the present invention.

ISOLATION AND CHARACTERIZATION OF AMMONIUMTRIBORATE

Ammoniumtriborate ($NH_4.B_3O_5.3CH_3$—OH) crystallizes from methanol in the form of optically clear, tightly grown, 2–10 mm long monoclinic prisms containing three molecules of crystal methanol. The crystals do not melt below 300° C. Single crystal X-ray diffraction analysis of the newly discovered ammoniumtriborate revealed its monoclinic crystal structure with a cell dimension of a=25.22 A°, b=7.09 A° ($\beta$=98.3°) and c=16.92 A°. The X-ray analysis was determined on a CAD-4 single crystal diffractometer, using CuK radiation. The survey of reflections was completed: $8°<2\theta<40°$.

The cell dimensions of ammoniumtriborate distinctly differ from the crystal cell structure of ammoniumtetraborate, ammoniumpentaborate or any other ammoniumborate derivatives which are reported to date in the Chemical Abstracts.

Using the relative intensities and calculated $2\theta$ angles (=1.5418 A°) from the single crystals as a guide, the powder patterns were indexed as given in Table I.

TABLE I

X-ray Diffraction Spacings and Intensity Values for Ammoniumtriborate ($NH_4.B_3O_5.3 CH_3$—OH)

| dA° | I | hKl |
| --- | --- | --- |
| 8.26 | >100 | 002, −102 |
| 6.68 | 17 | 011 |
| 6.53 | 27 | 202 |
| 6.21 | 4 | 400, 111 |
| 5.71 | 3 | −103 |
| 5.40 | 11 | 310 |
| 4.99 | 53 | −303, −501 |
| 4.79 | 7 | — |
| 4.34 | 8 | −113, 013, 303 |
| 4.14 | 17 | 600, −204 |
| 4.07 | 53 | −511, −313 |
| 4.01 | 16 | 502, 104, −503 |
| 3.51 | 27 | 114, 020 |
| 3.39 | 34 | 121 |
| 3.37 | 80 | −105, 701 |
| 3.25 | 15 | 320 |
| 3.21 | 6 | 122 |
| 3.19 | 6 | −613 |
| 3.14 | 8 | −801 |
| 3.07 | shoulder | −420 |
| 3.06 | 21 | −115, 711 |
| 2.86 | 10 | — |
| 2.79 | 12 | 802, 006 |
| | | Plus additional lines |

Nuclear magnetic resonance spectroscopy (NMR) revealed the presence of crystal methanol in ammoniumtriborate. When its crystals were dissolved in heavy water ($D_2O$) and subjected to NMR analysis, the methyl protons of the crystal methanol exhibited a singlet at $\delta 3.30$ ppm. Similarly, methanol in $D_2O$ also showed the characteristic chemical shift as a singlet at $\delta 3.30$ ppm (tetramethylsilane was used as internal standard).

Another proof for the presence of crystal methanol was obtained while ammoniumtriborate was dissolved and refluxed in water. The water-methanol mixture started to boil at 64° C. and by fractional distillation methanol could be separated and identified.

Finally, elemental analysis of ammoniumtriborate was in good agreement with the theoretical values, calculated from the empirical formula of $NH_4.B_3O_5.3C-H_3$—OH:

Required: C 15.89; H 7.06; N 6.18; B 14.32%. Found: C15.67; H 6.77; N 6.01; B 14.80%.

Experiments were conducted in order to ascertain whether the crystal methanol could be substituted with ethanol, or normal- and iso-propanol. No ammoniumtriborate formation was observed when tetraborate ores were reacted with ammonia and sulfurdioxide in hot ethanol or propylalcohols. These experiments proved that crystal methanol is an essential structural feature of ammoniumtriborate which cannot be substituted by other alcohols.

DETAILED DESCRIPTION OF INVENTION

The above referred ammoniumtriborate is manufactured by contacting a finely ground alkali metal or alkaline earth metal tetraborate ore at atmospheric pressure or in a closed system with ammoniumsulfite or preferably with ammonia and sulfuroxide gases in a body of methanol which serves the dual function of acting as solvent and reactant. There will be produced ammoniumtetraborate, which is spontaneously transformed into ammoniumtriborate. Some trimethylborate-ammonia adduct is also formed which can be changed into ammoniumpentaborate with the amount of water present which may derive either from the crystal wire in the ore or added as excess water. Furthermore, it was discovered that the replacement of crystal methanol of ammoniumtriborate with water transformed it also into ammoniumpentaborate.

If the ore is calcined (anhydrous) prior to treatment, mostly methylborate-ammonia adduct will be formed which, however, can readily be converted into ammoniumpentaborate by reacting it with water.

The new technology is applicable to all tetraborate ores, and as representative, there may be mentioned borax, kernite, and tincalconite.

Conventional technologies based on sodium borates produce water-soluble sodium salt as a by-product, e.g., sodiumsulfate, sodiumsulfite, sodiumcarbonate, etc. These inorganic salts can only be recovered from their water solution by high-energy-requiring evaporation. Alternatively, their disposal causes serious environmental problems.

This invention uses methylalcohol (wood alcohol) as solvent and ammoniumsulfite as a reagent to liberate the boron content from its ores in the form of products highly valuable in themselves. The comparatively low boiling methylalcohol (b.p. 64° C.) makes possible its relatively easy regeneration by distillation. Most importantly, the water-soluble Na-salt or other inorganic salt by-products are practically insoluble in methanol and, after the leaching of ore is completed, can be easily filtered from the methanolic solution.

Attempts to use ethanol, normal- or iso-propanol instead of methylalcohol failed to produce ammoniumtriborate. In fact, ammonium sulfite and borax in hot ethanol furnished ammoniumtetraborate instead of the expected ammoniumtriborate. Whereas, borate ores were leached out in a methanolic suspension in practically quantitative yields, ethanol extracted only 15% of the boron content of these ores. This finding clearly proved that the ammoniumtetraborate to ammoniumtriborate transformation is promoted only by methanol. Indeed, no other alcohol but methanol facilitates ammoniumtriborate production.

A most important finding of this invention is that the commonly occurring tetraborate ores are readily transformed with ammoniumsulfite in methanol first into ammoniumtriborate, which upon heating in water can be transformed into ammoniumpentaborate. The same chemical transformation of ammoniumtriborate to ammoniumpentaborate takes place in situ when the said methanolic solution of ammoniumtriborate is sprayed on the fibers or applied to fabric by immersion and exposed to humid air. Following a heat treatment of the fiber, ammonia gas and methanol distill off which can be recycled in the process. Before the curing step, the fiber is penetrated and its surface is also covered by ammoniumborates. By virtue of the good solubilities of these boron compounds in methanol and the easier penetration of the said solvent into the fibers than that of water solutions, the boron compounds are evenly deposited not only on the surface but within the fibers as well.

Microscopic studies with organic solvent soluble blue dye were conducted. When the dye was dissolved in the said methanolic solution of ammoniumtriborate, it showed an even penetration into the cellulose fibers. This finding partially explains why this new technology provides significantly better flame retardation and antismoldering effects than the conventional dry procedure, wet application of ammoniumpentaborate, or vapor deposition of boric acid (N. B. Knoepfler et al, Proceedings Int. Symp. on Flammability and Fire Retardants, Montreal, Canada, 1975, p. 115-125; J. P. Madacsi et al., Ind. Eng. Chem. Prod. Res. Dev. 15, 71-75, 1976; J. P. Madasci et al., J. Fire Ret. Chem., 4, 73-92, 1977 and references therein). Experiments proved that one needs twice as much boric acid ($\approx$18-20%) as ammoniumtriborate ($\approx$10%) of this invention for achieving equal flame retardation and antismoldering properties on cellulosic fiber.

The reaction taking place during the leaching of borax pentahydrate or other tetraborate ores in the presence of ammonium sulfite in methanolic suspension may be represented by Equations 1 a-c:

$$15 Na_2B_4O_7 \cdot 5\ H_2O + 30\ NH_3 + 15\ SO_2 \longrightarrow \quad (1a)$$
Borax $$15(NH_4)_2B_4O_7 \cdot 4\ H_2O + 15\ Na_2SO_3$$
Ammoniumtetraborate $$15(NH_4)_2B_4O_7 \cdot 4\ H_2O \xrightarrow{+60\ MeOH} \quad (1b)$$

$$20\ NH_4 \cdot B_3O_5 \cdot 3\ CH_3-OH + 10\ NH_3 + 60\ H_2O$$
Ammoniumtriborate $$20\ NH_4 \cdot B_3O_5 \cdot 3CH_3-OH + 60\ H_2O \xrightarrow{-60\ MeOH} \quad (1c)$$

$$12\ NH_4 \cdot B_5O_8 \cdot 4\ H_2O + 8\ NH_3 + 12\ H_2O$$
Ammoniumpentaborate The first stage (Eq. 1a) is represented by a displacement reaction. The driving force of this reaction is the solubility difference between the two products: ammoniumtetraborate and sodiumsulfite in methanol. The first being very soluble and the latter insoluble in hot methylalcohol. The driving force for the second step (Eq. 1b) seems to be the formation of the more stable triborate structure which is accompanied by the loss of ammonia and water. Indeed, during the reaction, copious ammonia gas evolution is observed.

Support for the mechanism shown by Equations 1a and 1b is provided in the instant ammonium release when equimolar mixture of ammoniumsulfite and borax in methanol is stirred at room temperature. This finding suggests that the intermediate ammoniumtetraborate is readily transformed during the treatment of borax pentahydrate or other tetraborate ores with ammoniumsulfite into ammoniumtriborate, ammonia and water (Eq. 1b). It was then found that the suspension of ammoniumtetraborate and ammoniumsulfite in boiling methanol produced ammoniumtriborate within minutes in excellent yield.

As a net result of Equation 1a and 1b, one third of the ammonia, originally applied in the form of ammoniumsulfite, is being regenerated. If the reaction is carried out in a closed system, this regenerated ammonia gas can be recycled. Thus, in an autoclave, it is possible to use two-thirds (=1.33 mole) equivalent of the theoretically necessary amount of ammonia gas for every one mole equivalent amount of the sulfurdioxide for the completion of leaching one mole amount of the tetraborate ore.

According to Equations 1a and 1b, 80% of the crystal bound water content of borax remains unused. But, in the third state of this reaction series, after the methanol solvent was removed, crystal water decomposes ammoniumtriborate to ammoniumpentaborate with the expulsion of ammonia gas (Eq. 1c). This ammonia loss theoretically equals to another 27% of the ammonia originally applied. The above transformation takes place after the evaporation of the bulk of the methanol and heating the solid residue. Then, the undistilled crystal water and heat completes the last step (Eq. 1c).

The first proof to the above suggested mechanism of Eq. 1c was found after refluxing and distilling a methanolic solution of pure ammoniumpentaborate which was quantitatively transformed into methylborate and ammonia gas. Contrary to the above, a methanolic solution of ammoniumtriborate could be evaporated unchanged to a solid in about 95% yield. Only 3-5% boron content distilled over with methanol in form of methylborate. This finding proved that, contrary to ammoniumpentaborate, ammoniumtriborate does not decompose while boiling in methanol.

The crystal water remaining in the reaction mixture is also useful for hydrolyzing the by-product: methylborate-ammonia adduct. Support for this mechanism was found when anhydrous borax was refluxed in methanol with equimolar ammoniumsulfite. Here, not only ammonia gas was liberated, but also a colorless solid sublimed from the reaction mixture which eventually clogged the reflux condenser. Filtration of the hot methanolic slurry yielded the expected sodiumsulfite in quantitative yield. Furthermore, upon evaporation of the methanol filtrate, ammoniumtriborate was also obtained. The solid which sublimed into the condenser was identified as the trimethylborate-ammonia adduct. Its formation is explained by Equation 2.

$$Na_2B_4O_7 + (NH_4)_2SO_3 + 16\ CH_3-OH \longrightarrow \quad (2a)$$

$$Na_2SO_3 + 4[(CH_3O)_3B \cdot CH_3-OH] + 7H_2O + 2\ NH_3$$

$$2[(CH_3O)_3B \cdot CH_3OH] + 2\ NH_3 \longrightarrow \quad (2b)$$

$$2[(CH_3O)_3B \cdot NH_3] + 2 CH_3-OH$$

First, ammonium sulfite reacts with anhydrous borax in the presence of methanol, leading to methylborate-methanol azeotropic mixture, ammonia, water and sodiumsulfite (Eq. 2a). Then, methylborate and ammonia form an adduct and sublime as methylborate-ammonia addition complex (Eq. 2b).

An authentic sample of methylborate-ammonia adduct made from ammonia and methylborate in methanol and the sublime of Equation 2b exhibited identical IR and NMR spectra IR: $\lambda_{max}^{nujol}$ 2900, 2840, 2210, 1970, 1450, 1370, 1340, 1200, 1050, 960 and 920 cm$^{-1}$; NMR: $\delta 3.50$ ppm (s, OCH$_3$), $\delta 1.45$ ppm (b, NH$_3$) in CDCl$_3$ (TMS internal standard). The two chemical shifts of freshly prepared samples showed a proton ratio of 3:1 which is in agreement with formula [(CH$_3$O)$_3$B.NH$_3$].

Another important finding of this invention is that the methylborate-ammonia adduct can be transformed into ammoniumpentaborate in the presence of water. The reaction can be explained by Equation 3.

$$5[(CH_3O)_3B \cdot NH_3] + 15 H_2O \longrightarrow \quad (3)$$

$$[NH_4 \cdot B_5O_8 \cdot 4 H_2O] + 4 NH_3 + 3H_2O + 15CH_3-OH$$

Experiments verified that the methylborate-ammonia addition product instantly reacts with water, loses ammonia, and stabilizes in ammoniumpentaborate. The structural assignment of the latter was verified by infrared spectroscopy and elemental analysis.

Further experiments indicated that reactions described in Equations 1-3 must correlate with each other in methanol. In the presence of adequate water, tetraborate ores undergo a three-step reaction. First, ammoniumsulfite and alkali metal borates exchange cations and ammoniumtetraborate is formed (Eq. 1a). Then, in hot methanol, ammoniumtetraborate rearranges into the ammoniumtriborate structure, as shown by Equation 1b. As a side reaction, the tetraborate ore is transformed into the methylborate-ammonia adduct which, in turn, yields ammoniumpentaborate upon water treatment. In fact, two concomitant mechanisms compete with each other as shown by Equation 1 versus 2 and 3. As a result, after leaching the borate ore, the warm methanolic filtrate contains a mixture of ammoniumtetraborate and ammoniumtriborate, accompanied by a small amount of methylborate-ammonia adduct. The main product (>90%) is ammoniumtriborate. In the presence of water, ammoniumtriborate and methylborate-ammonia adduct are transformed into ammoniumpentaborate.

Ammoniumsulfite is not the only reagent which generates ammoniumtriborate from tetraborate ores in warm methanol. Ammoniumsulfite was successfully substituted with ammoniumsulfate. In this case, the less desired inorganic sulfate was filtered off as a by-product In summary, this invention produces a new composition: ammoniumtriborate and methylborate-ammonia adduct as a by-product in methanolic solution. As it will be demonstrated by the Examples, this mixture of ammoniumborate compounds provides unique fire retardant, anti-smoldering and corrosion-free properties when applied on cellulosic fiber insulation, cotton batting, and other fibers which are exposed only to dry launderings.

An additional improvement of flame retardation and corrosion resistance was achieved by the addition of 0.1-5% inorganic sulfites to the composition.

After the chemical reactions described by Equations 1a,c are completed, the methanol insoluble by-product, sodiumsulfite (or other alkali metal, alkaline earth metalsulfite), along with the gangue present, is filtered.

Then, the warm methanolic filtrate of ammoniumtriborate can be applied on the said fibers either by a suitable spraying unit or by a soaking-wringing technique. In both cases, the methanol and ammonia gas have to be removed and recycled while the fiber is heat cured.

As an alternate technology, we discovered that the methanolic solution of ammoniumtriborate can be concentrated, if so desired, into a thick syrup by removing most of the methanol ($\div 80\%$) while excessive heat is avoided. It is preferred to use distillation temperatures between 20°-60° C. under vacuum. Under these conditions, the transformation into ammoniumpentaborate can be avoided.

The presence of a small amount (<5%) of methylborate in the reactions described in the preceding part of this invention raised the question of reaction mechanism and prompted further investigation. As a result, an alternate technology was discovered.

If a methanolic suspension of borate ores was treated first with equimolar amount of sulfurdioxide in a closed system, methylborate was formed in high yield (Scheme A, Eq. 4a,b). Then, ammonia was reacted with the methylborate thus formed. An exothermic reaction took place and, upon further heating to the boiling point of methanol, methylborate-ammonia adduct was formed (Eq. 4c), which, in the presence of crystal water, stabilized in the form of ammoniumpentaborate (Eq. 4d). While this latter reaction took place, ammonia was released which was automatically recycled in the closed system. Utilizing these fast reactions, 20-40% of the theoretically required ammonia can complete the reactions (Scheme B, Eq. 4c-d) while the ammonia gas is recycled. Ammoniumpentaborate was obtained in 97% yield. The crude final product was analyzed by thermometric titration which verified its 98.2% purity.

SCHEME A $$5Na_2B_4O_7 \cdot 10 H_2O + 5 SO_2 \xrightarrow{MeOH} 5Na_2SO_3 + 5[H_2B_4O_7 \cdot 9 H_2O] \quad (4a)$$
Borax $$5[H_2B_4O_7 \cdot 9 H_2O] + 60 MeOH \xrightarrow{H+} 20 (CH_3O)_3B + 80 H_2O \quad (4b)$$
Methylborate $$20(CH_3O)_3B + 20 NH_3 \longrightarrow 20 [(CH_3O)_3B \cdot NH_3] \quad (4c)$$
Methylborate-ammonia adduct $$20[(CH_3O)_3B \cdot NH_3] + 48 H_2O \longrightarrow \quad (4d)$$

$$4 NH_4 \cdot B_5O_8 \cdot 4 H_2O + 16 NH_3 + 60 CH_3-OH$$
Ammoniumpentaborate

SCHEME B

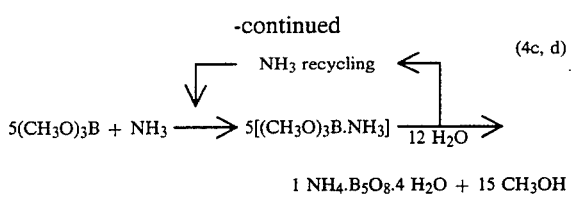

$$1\ NH_4.B_5O_8.4\ H_2O + 15\ CH_3OH$$

The understanding of the above mechanism (Eq. 4a-d) helped to prevent the small percentage of methylborate formation during ammoniumtriborate preparation. If one introduces the total amount or its fraction of ammonia gas first into one methanolic slurry of the tetraborate ores and adds sulfurdioxide subsequently to the mixture so that the pH is constantly kept in the alkaline region, pure ammoniumtriborate is obtained. Under these conditions, practically no methylborate-ammonia adduct is produced.

The following lists the advantages of this invention:

1. The most important discovery of this invention is the transformation of tetraborate ores into ammoniumtriborate in methanolic solution after the said ore is leached, filtered and evaporated under mild conditions according to the practice of this invention. Then, water treatment and heat transforms said ammoniumtriborate into ammoniumpentaborate.

2. Another important advantage of this invention is that the said boron compounds provide a new composition with superior fire retardant, anti-smoldering, corrosion free and fungal resistant properties when applied on cellulosic fiber, cotton batting, carpeting, furniture padding, upholstery fabric and other natural or synthetic fibers which are subject only to dry laundering.

3. An additional advantage of this invention is that the methanolic mixture of boron compounds forms an evenly distributed coating on the surface of fibers upon spraying and evaporating the solvent. In addition, the methanolic solution of the boron containing composition is absorbed by the fibers. The methanolic solution of this invention first forms a sticky, colorless gum when the solvent is evaporated. Then, crystallization of ammoniumtriborate takes place on the surface and within the fibers. These physical and chemical properties endow the methanolic solution of ammoniumtriborate with better surface deposition onto and penetration into the cellulosic fibers.

4. A further paramount importance of this invention is that ammoniumtriborate and its transformation product, ammoniumpentaborate, are non-volatile compounds. As a result, the radiant flux panel test or the two-foot tunnel tests showed no green flame discoloration, characteristic of the presence of the volatile boric acid. Consequently, following the technology of this invention, the treated fibers contain no free boric acid.

Therefore, this new technology offers great advantage over the so-called "vapor phase deposition" of boric acid through methylborate (N. B. Kneopfler et al., 1975, and J. P. Madacsi et al., 1976, 1977, vide supra). The volatility of both methylborate and boric acid is well documented. Consequently, significant boron losses occur after the treatment of the fiber. Moreover, methylborate-boric acid equilibrium does not allow higher than 6.1 weight percent add-on boric acid content on cellulosic fiber. This limit is the result of reversibility of the chemical reaction between methylborate, boric acid and water (J. P. Madacsi et al., 1977, vide supra).

This invention circumvents the above problem by applying a non-volatile ammoniumtriborate which is then stabilized in situ as ammoniumpentaborate when the practice of this invention is followed.

Earlier, J. P. Madacsi et al (1976, vide supra) have shown that boric acid donors, such as ammoniumpentaborate secure smolder-resistant cellulosic fiber. However, according to this invention, pure ammoniumtriborate or the mixture of ammoniumtriborate, ammoniumpentaborate, and ammoniumsulfite provide a superior flame retardant and anti-smolder agent if compared with ammoniumpentaborate alone or its water solution and applied on an equal weight add-on basis. As a comparison, cellulosic fiber insulation material made from newspaper was sprayed with a warm water solution of ammoniumpentaborate. After air-drying and conditioning at 50% humidity for 24 hours, the cellulose fiber showed a 13.7% add-on. This fiber exhibited a flame spread rating (FSR) of 28, a cigarette smoldering test (CST) of 1.2% and its radiant flux panel test (RFP) failed at 104 cm.

Parallel experiments were made with the methanolic ammoniumtriborate spray of this invention. The ammoniumtriborate add-on ranged between 8.3-13.6%. Flame spread ratings were found between 9.0-18.8. Radiant flux panel tests showed values between 42-67 cm. The cigarette smoldering tests were spread from 0.0 to 1.2% weight losses. All products were non-corrosive. Table II summarizes the results of the flame tests.

TABLE II

Flame Tests of Ammoniumtriborate Applied in Methanolic Solution

| Number of Experiment | Ammoniumtriborate add-on %[1] | Ammoniumsulfite add-on % | FSR[2] | RFP[3] in cm | CST[4] weight loss in % | Density[5] |
|---|---|---|---|---|---|---|
| 1 | 8.3 | 0.6 | 15.0 | 67 | 1.2 | 2.0 |
| 2 | 10.3 | 0.3 | 15.6 | 50 | 0.4 | 2.0 |
| 3 | 10.9 | 0.3 | 17.0 | 50 | 1.1 | 1.9 |
| 4 | 11.0 | 0.3 | 18.8 | 54 | 0.2 | 1.9 |
| 5 | 11.2 | 0.2 | 17.0 | 53 | 0.8 | 2.0 |
| 6 | 13.0 | 0.4 | 9.0 | 53 | 0.2 | 2.3 |
| 7 | 13.6 | 0.4 | 14.0 | 42 | 0.0 | 2.2 |

[1]Expressed in boric acid %, determined by thermometric titration
[2]Flame spread rating test
[3]Radiant flux panel test; 85 cm equals 0.12 watt/cm$^2$
[4]Cigarette smoldering test
[5]Density is expressed in lb/ft$^3$ of the tested product These experiments clearly show that as low as 8.3% add-on of ammoniumtriborate on cellulosic fiber insulation material passes all fire tests. But, ammoniumpentaborate at a much higher level (13.7% add-on) fails to meet the government's regulations. Consequently, ammoniumtriborate represents a superior flame retardant and anti-smoldering agent when compared with ammoniumpentaborate.

After ammoniumtriborate treatment, the insulation material was conditioned for 24 hours at 50% humidity. During that period of time, ammoniumtriborate, at least the surface deposited portion of it, slowly changed to ammoniumpentaborate. After several weeks of aging process in humid atmosphere, followed by an equilibration at 50% humidity for 24 hours, the insulation retained its original flame test values.

As an alternative technology, the bulk of methanol (≧80%) can be distilled off from ammoniumtriborate. (There was a 3-5% boron content loss observed which distilled along with methanol as methylborate. The methanolic solution of said methylborate was recycled with the next batch of operation.) The solid residue obtained after the removal of methanol was dissolved in suitable amount of hot water which was sprayed on or soaked into the fiber.

Depending upon the conditions (ratio of water-methanol, heat, reaction time, and concentration), ammoniumtriborate changed into ammoniumpentaborate with the concomitant loss of ammonia (Eq. 1c). The ratio of methanol to water can vary from 100:1 to 1:1, the heat of evaporation should be held below 64° C., preferably between 20°–50° C. The reaction time, counted from the completion of ammonia and sulfurdioxide introduction into the reactor could be between a few minutes up to 1 hour. The preferred reaction time is 15–30 minutes. The solid content, i.e. the amount of ammoniumtriborate dissolved in methanol and crystal water mixture can be anywhere from a few percentages up to 85%. If one uses a dilute methanolic spray, the preferred concentration is between 15–25% (w/v). However, if a thicker syrup is favored, the best concentrations are between 50–80% solid content. Short reaction time, low temperature, and fast removal of methanol secures higher purity of ammoniumtriborate (>90%). Contrarily, longer exposure to heat and higher relative ratio of water will facilitate the ammoniumtriborate to ammoniumpentaborate transformation as expressed by Equation 1c. The methanol containing water solution of ammoniumborate mixtures, especially in the presence of small percentages of ammoniumsulfite (0.1–5.0%) or other suitable sulfites were also found to be remarkably effective agents in rendering cellulose fiber based insulation material, fabrics and other natural or synthetic fibers flame resistant, anti-smoldering and non-corrosive.

The results of four series of experiments have shown that, with between 10.3–14.8% add-on of said ammoniumborate salts, 14–28 flame spread ratings were observed. Radiant flux panel tests have shown a 64–81 cm variation and cigarette smoldering tests ranged between 0.8–5.2% weight losses. Table III shows the data of these tests.

All tests were conducted according to the U.S. Public Law 95-319, Part 43-FR-39564, effective Oct. 15, 1979, except the flame spread rating which was determined on a Custom Scientific Instruments (Whippany, N.J.) Model CS-204 two-foot flame tunnel.

TABLE III

Flame Tests of Ammoniumtriborate-Ammoniumpentaborate Mixture Applied in Water-Methanol Solution

| Number of Experiment | Ammoniumborate add-on %[1] | Ammoniumsulfite add-on % | FSR[2] | RFP[3] in cm | CST[4] weight loss in % | Density[5] |
|---|---|---|---|---|---|---|
| 1 | 10.3 | 0.2 | 23 | 81 | 2.1 | 2.7 |
| 2 | 13.8 | 3.0 | 25 | 66 | 0.0 | 1.9 |
| 3 | 14.6 | 0.2 | 15 | 64 | 0.8 | 2.0 |
| 4 | 14.8 | 0.2 | 14 | 65 | 5.2 | 2.7 |

[1]Expressed in boric acid %, determined by thermometric titration
[2]Flame spread rating test
[3]Radiant flux panel test; 85 cm equals 0.12 watt/cm$^2$
[4]Cigarette smoldering test
[5]Density is expressed in lb/ft$^3$ of the tested product 5. An additional discovery of this invention is that small amounts (0.1–5.0%) of ammonium sulfite or organic sulfites such as primary, secondary alkylammonium- or hydroxyalkyl-ammonium-sulfites, or the mixture thereof further improve the flame retardation and anti-corrosion properties of the methanolic solution of ammoniumborates. The sulfites also act as antioxidants. Hence, they present an excellent protection against corrosion and greatly decrease the flame spread measured by the radiant flux panel test. However, alkali metal or alkaline earth metal sulfites enhance smoldering due to the effect of their cations. The latter phenomenon was earlier observed by R. J. Carter (J. Consumer Prod. Flammability 4, 346–358, 1977).

The % sulfites is expressed as weight % of the ammoniumtriborate add-on.

6. Another advantage of this invention is that it allows for easy removal of inorganic by-product and gangue by filtration from the desired borate products.

7. A further characteristic of the process of the invention is its relative low-energy requirement. In fact, the exothermic reaction of ammonia and sulfurdioxide elevates the temperature of the mixture to the boiling point of methanol and the evolved heat completes the reaction. There is no need for external heat energy.

8. The economy of this process was improved as compared to my U.S. Pat. No. 4,196,177, issued Apr. 1, 1980. Namely, this invention uses one-third less ammonia gas as stoichiometrically required (Eq. 1a, b) when the process is performed in a closed reaction vessel. The spontaneous transformation of ammoniumtetraborate into ammoniumtriborate theoretically liberates 33% of the ammonia originally applied. The recycling of this amount of ammonia leads to significant savings.

9. The application of the "Alternate Technology" led to another 27–47% ammonia saving and yielded methylborate-ammonia adduct or ammoniumpentaborate as described by Eq. 4a–d.

10. An additional advantage of the process of the invention is that it has a low level of corrosiveness.

11. Finally, the invention creates no waste problem with its attendant advantage of not polluting the environment.

12. As an alternate technology to the above described wet application technique (i.e., 4 and 5 supra), a dry application of ammoniumtriborate, ammoniumpentaborate and inorganic or organic sulfite composition also can be used. In the dry-process, the add-on of the said composition was increased by several percentages (2–5%) in order to achieve comparable flame retardation properties with the wet process.

Both application techniques can be utilized on virgin, processed, reconstituted, or recycled organic materials or fibers such as newsprint, woodchips, wood shavings, sawdust, woodpanels, corn cobs, bagasse, peanut shells and other plant materials.

The following examples are given as illustrating the present invention but are not to be considered as limiting the same.

EXAMPLE 1

Into a stirred suspension of 582.7 g (2 mole) of borax ($Na_2B_4O_7.5H_2O$) in 2 liter methanol, 68 g (4 mole) ammonia and 128 g (2 mole) sulfurdioxide gases were simultaneously introduced within 16 minutes. The reactor was equipped with a thermometer, stirrer and a reflux condenser. The gas introduction was measured by rotameters. While the gases were introduced, the temperature of the reaction was controlled by external cooling. After the introduction of the gases, external heating was applied for maintaining gentle boiling for an additional 10–30 minutes. From the hot suspension, sodiumsulfite was filtered off through a pressure filter system. The dried sodiumsulfite weighed 240 g. Theoretical yield 243 g. The warm filtrate was composed mainly by ammoniumtriborate, mixed with small amounts of ammoniumpentaborate, methylborate-ammonia adduct, and ammoniumsulfite. This methanolic solution is useful in a form of a spray for rendering fibers flame resistant as will be explained in Examples 6, 17, 18, 3A and 7A.

EXAMPLE 2

In a pressure vessel equipped with gas inlets, pressure gauge, thermometer well and stirrer, 1164 g (4 mole) borax ($Na_2B_4O_7.5H_2O$) was covered by three to four liter methanol. Into the well-stirred reaction mixture, 90.6 g (5.33 mole) ammonia and 256 g (4 mole) sulfurdioxide gases were introduced. The gas flow was measured by rotameters and the ammonia gas was kept constantly in excess of sulfurdioxide. Total gas introduction took 20–40 minutes. An exothermic reaction ensued. The reactor showed no pressure at, or below 64° C. The mixture was stirred for an additional 10–30 minutes while the temperature cooled to about 60° C. Then the hot reaction mixture was filtered on a pressure filter. The ammoniumtriborate content when analyzed by thermometric titration (using Sanda Thermo-Titrator, Philadelphia, Pa.) represented 95.8% boron value recovery from the borax used. The methanolic filtrate was applied as a spray for the fire retardation of cellulosic fiber or fabrics as explained in Examples 6, 17, 18, 3A and 7A. The dried filter cake of the above methanolic filtrate weighed 592.6 g and contained less than 0.2% borax. Theoretical yield for $Na_2SO_3.H_2O$ is 576.0 g. Yield 102.8%.

EXAMPLE 3

Following the procedure of Example 2, but substituting borax pentahydrate with equimolar amount of borax decahydrate (1525.7 g=4 mole), 96% of the boron content was leached out. Here, too, ammoniumtriborate was identified as the major product.

EXAMPLE 4

Following the procedure of Examples 1–3, but keeping the methanolic filtrate of ammoniumtriborate at room temperature until shiny, transparent and closely spaced monoclinic crystals were deposited. The crystals were filtered, dried in a desiccator and correctly analyzed for the formula of ammoniumtriborate, $NH_4.B_3O_5.3CH_3$—OH:

Required: C 15.89; H 7.06; N 6.18; B 14.32%. Found: C 15.67; H 6.77; N 6.01; B 14.80%.

The crystal-cell dimension of a single crystal X-ray diffraction analysis revealed the novel structure of ammoniumtriborate. The X-ray diffraction spacings and intensity values for ammoniumtriborate are shown in Table I.

Nuclear magnetic resonance spectroscopy verified the presence of crystal methanol, exhibiting a singlet at $\delta 3.30$ ppm for the three protons of its methyl group. The measurement was carried out in heavy water ($D_2O$).

EXAMPLE 5

Following the procedure of Example 2, but vacuum evaporating the filtered methanolic solvent of ammoniumtriborate below 50° C., the removal of up to 80% of methanol was possible with minimum amount of ammoniumpentaborate formation. The suitably concentrated methanolic solution of ammoniumtriborate was used for the spray-dry treatment of fibers.

EXAMPLE 6

A solution of methanol soluble (water insoluble) dye (0.1–0.25% w/v) was added to a warm methanolic solution of the ammoniumborate composition described in Examples 1–3. The colored ammoniumborate mixture, while still warm, was then sprayed onto the cellulosic fiber insulation material. The coloring dye monitors the homogeneity of the spraying technique and helps to identify the product. While the spraying was applied, the fiber was evenly tumbled and moved in a suitably constructed spray-mix and flash dry unit. During the process, methanol and excess ammonia are recovered and recycled. Using the above technology, cellulosic fiber was treated and resulted in a 10.1% ammonium triborate (corresponds to 8.3% boric acid) and 0.6% ammoniumsulfite add-on. The sample exhibited the following test results: flame spread rating (FSR) 15, radiant flux panel test (RFP) 67 cm, and cigarette smoldering test (CST) 1.2%. Another sample of cellulosic fiber was sprayed with the methanolic ammoniumborate mixture of Example 2 or 5 and, after drying and conditioning in a 50% humidity chamber, the ammoniumborate content was determined by thermometric titration. Its original ammoniumtriborate add-on was 13.6% (=11.2% boric acid add-on). The ammoniumsulfite add-on was 0.24%. The test results of this fiber were as follows: FSR 17, RFP 53 cm, CST 0.8%. All corrosion test conducted on steel, copper, and aluminum test specimens were carried out according to the U.S. Public Law 95-319, Part 43-FR-39564, effective Oct. 15, 1979. Tests showed no corrosion. Further examples are shown in Table II.

EXAMPLE 7

Following the procedure described in Examples 1–3, but evaporating the filtered methanolic solution of ammoniumtriborate. After about 80% of the methanol was distilled off at atmospheric pressure, a solid separated out which was mostly ammoniumtriborate mixed with a low percentage of ammoniumpentaborate. The solid residue was dissolved in hot water, resulting in 25–60% (w/v) solution to which 0.5–5.0% ammoniumsulfite was added. (As an alternate procedure, an adequate amount of sulfurdioxide can be introduced into the methanolic solution before its distillation. The excess ammonia which is present forms the required ammoniumsulfite.) Then, the hot water solution of the above composition was sprayed on the cellulose-fiber based insulation material. After the fiber was conditioned at 50% humidity for 24 hours, it exhibited excellent fire retardant, smolder resistant and non-corrosive properties.

A 13.8–14.6% add-on of ammoniumtriborate-ammoniumpentaborate mixture (expressed in boric acid %) provided a flame spread value range of 14–25. The radiant flux panel values were between 64–66 cm. The cigarette smoldering test showed 0.0–5.2% losses. The mixture of chemicals used secured corrosion free insulation material. The detailed results are shown in Table III.

EXAMPLE 8

76.2 g (=0.2 mole) borax.$10H_2O$ was suspended in 400 ml of methanol and treated with 52.8 g ammoniumsulfate. The reaction mixture was refluxed for up to 1 hour, while ammonia gas evolved. The by-product, sodiumsulfate, was filtered off. It weighed 55.5 g (=97.7%). The warm methanolic filtrate produced ammoniumtriborate in practically quantitative yield.

EXAMPLE 9

Following the procedure of Example 2, but substituting methanol with ethanol, the ethanolic filtrate contained 15% of the theoretical boron content which was slowly deposited as a white, opaque microcrystalline solid. After several recrystallizations from water, ammoniumpentaborate was identified in low yield. The analysis of stout, transparent crystalline ammoniumpentaborate showed a 1:4.94 ammonia-boric acid ratio. (Theoretical value is 1:5.00.)

The filter cake of the above reaction mixture was 235% of the expected weight of sodiumsulfite. Recrystallization of this material from water yielded ammoniumtetraborate in good yield. The ammonia-boric acid ratio was 1:2.07. (Theoretical value for ammoniumtetraborate is 1:2.00.)

EXAMPLE 10

270.0 g ammoniumpentaborate ($NH_4.B_5O_8.4H_2O$) were dissolved into 1500 ml hot water resulting in an 18% (w/v) solution. 680 ml of this solution were sprayed onto 1000 g cellulosic fiber using the spray-mix and dry unit. The dry fiber was conditioned at 50% humidity and showed a 13.7% ammoniumpentaborate add-on. The sample did not pass the radiant flux panel test (104 cm) and had a flame spread rating of 28 and cigarette smoldering test value of 1.2%. This and other similar results proved that ammoniumtriborate composition of Examples 2, 5, and 6 represent significantly better flame retardants than ammoniumpentaborate when applied alone.

EXAMPLE 11

Following the procedure of Example 10, but substituting ammoniumpentaborate with ammoniumtetraborate [$(NH_4)_2.B_4O_7.4H_2O$], an 11.6% add-on of the latter was applied on cellulosic fiber. The sample failed the radiant heat panel test (104 cm), exhibited a flame spread rating value of 25 and cigarette smoldering test of 2.0%. This is another proof for the excellence of the ammoniumtriborate composition of Examples 1-3, 5 and 6 versus ammoniumtetraborate. Examples 6 and 7 clearly demonstrate the superiority of the ammoniumtriborate and ammoniumsulfite mixture as a flame retardant composition when compared with pure ammoniumpentaborate or ammoniumtetraborate.

EXAMPLE 12

Dry ammonia gas (61 g) was dissolved in 500 ml methanol while the temperature was kept below 20° C. Then, 346.0 g methylborate (Schlesinger et al, J. Am. Chem. Soc., 75, 215, 1953) dissolved in 250 ml methanol was slowly added to the above ammonia solution while the temperature was kept below 25° C. by an ice bath. After several hours, large crystals of methylborate-ammonia adduct [$(CH_3O)_3B.NH_3$] separated out. The crystals were dissolved by adjusting the total volume to 2 liter with methanol. The concentration of the adduct in methanol was 19.3% (w/v). This solution was used as a fire retardant spray on cotton batting as described in Example 13.

EXAMPLE 13

Methylborate-ammonia adduct solution of Example 12 was sprayed on steamed cotton batting. The hydrolysis and rearrangement of said adduct by the adsorbed water to ammoniumpentaborate took place in situ. The cotton batting was dried at 110° C. and, after equilibrating in a 50% humidity atmosphere, the sample showed a 6.0% add-on of ammoniumpentaborate. The sample passed the lighted cigarette test if placed on the cotton. Only a 5 mm wide char developed around the completely burned cigarette and no further smoldering occurred. If the cigarette was placed between two sheets of the treated cotton, there was a 2 cm charring around the burned cigarette. Again, no further smoldering developed. This cotton batting sample passed the tests required by the Mattress Flammability Standard FF 4-72, implemented in December, 1973.

EXAMPLE 14

Borax.$10H_2O$, 762.0 g (2 mole) was stirred in 2 liter methanol in a closed system and 128.0 g (2 mole) sulfurdioxide gas was introduced within 20 minutes into the suspension. Then, 30.0 g (1.76 mole) ammonia gas was introduced into the vessel within 8 minutes. The exothermic reaction raised the temperature to 44° C. Following the ammonia gas reaction, the mixture was heated to 64° C. and kept there for 30–60 minutes. No pressure was observed in the reaction vessel. After pressure filtration of the hot methanolic suspension, sodiumsulfite (245.8 g) was filtered off; yield 97.5%.

The methanolic filtrate was treated with adequate amount of water (≈50% of the volume of the methanolic solution) followed by the evaporation of the methanol-water mixture. The dry residue weighed 434.0 g. Theoretical yield for ammoniumpentaborate is 435.0 g. Analysis of the crude product showed 98.2% purity. A recrystallization of this product from hot water yielded pure ammoniumpentaborate. The analysis showed an ammonia/boric acid ratio of 1:4.99. (Theoretical ratio is 1:5.00.)

EXAMPLE 15

Following the procedure of Example 14, using borax.$5H_2O$ instead of borax.$10H_2O$, ammoniumpentaborate was obtained in 95% yield.

EXAMPLE 16

A one-inch thick, moist cotton batting (5"×10") used for mattress, was soaked in the methylborate-ammonia adduct solution of Example 12. After curing at 110° C. and conditioning in a 50% humidity chamber, the cotton was analyzed for a 6.6% weight increase. Similar to Example 13, the lighted cigarette tests showed excellent results. No ignition or smoldering of the cotton sample occurred.

EXAMPLE 17

A one-inch thick sample of cotton batting (5"×10"), weighing 94.5 g, was soaked or sprayed on with the methanolic solution of ammoniumtriborate composition of Examples 2 or 5, respectively. After curing, the add-on of ammoniumtriborates was 10.1% (expressed in boric acid %). This sample was self-extinguishing and the cotton was barely charred around the lighted cigarette. No smoldering ensued.

EXAMPLE 18

Cotton batting samples (12"×2"×½") were soaked or sprayed on with the methanolic ammoniumtriborate composition of Examples 2 or 5, respectively. After air drying and heat curing at 120° C. for two hours and equilibration in 50% humidity chamber, the sample showed a 9.1% add-on (expressed in boric acid %). The sample was tested according to the State of California Flame Retardance Standard Test requirements which are described in the Technical Information Bulletin No. 117 on May, 1971. The said Bulletin is titled "Requirements, Test Procedure and Apparatus for Testing the Flame Retardancy of Filling Materials Used in Upholstered Furniture." The required average afterflame time, average afterglow time, average main char length, and maximum char length of this sample were within the allowed limits.

As set forth in the examples, a water insoluble, methanol soluble dye is advantageously added to the composition. This provides a ready visual means for determining the extent and uniformity of treatment of the fibers. Any water insoluble, organic soluble dye may be used. Such dyes include Intraplast yellow and Intraplast brilliant blue available from Crompton and Knolles of Reading, Pa., but other suitable dyes are also available commercially.

In case the methanol as solvent is undesired, a water or methanol-water solution technique, described in Examples 5 or 7, respectively, can be successfully applied.

Since the ammoniumborate composition of this invention is soluble in methanol or water, it may be readily applied to the fibers using conventional techniques and equipment known to the art. The amount of composition to be added to fiber will depend upon the fiber and the degree of treatment required as well as the economics of the materials. These factors may be readily determined based upon the present exemplification. However, it has been determined that sufficient treatment is obtained with an add-on of 6–14%, on a dry weight basis. This amount of add-on can readily be added to the fibers from the methanolic flame retardant composition which has a concentration of from 10–25% and preferably $\geq$80% of borates (w/v). The reconstituted, hot methanolic water solution of ammoniumtriborate-ammoniumpentaborate-ammoniumsulfite solution of Example 7 has a preferred concentration of 25–60% (w/v).

EXAMPLE 19

Ammoniumpentaborate (5.0 g) was refluxed in about 30 ml methanol for 30 minutes and evaporated to dryness. A solid residue of 2.43 g remained in the flask. This equals to 48.6% weight loss. The above procedure was repeated with a second batch of 30 ml methanol. After refluxing and evaporating, no solid was left in the flask. Evidently, ammoniumpentaborate was completely decomposed. The two degradation products: methylborate and ammonia were identified by the conventional analytical techniques.

EXAMPLE 20

Ammoniumtetraborate (=ammoniumbiborate) 13.1 g (0.05 mole) and ammoniumsulfite, 6.70 g (0.05 mole) were refluxed in 50 ml methanol for one hour. Ammonia gas was evolved from the reaction mixture. After the filtration of 3.6 g filter cake, the reaction was set aside until crystallization commenced. Hard, clear crystals of ammoniumtriborate deposited in two crops, totaling 8.90 g. Its thermometric titration showed an ammonia/boric acid ratio of 1:3.00.

Recrystallization of this ammoniumtriborate from water, as expected, yielded ammoniumpentaborate while ammonia was released. Thermometric titration of this pentaborate crop showed an ammonia/boric acid ratio of 1:4.80 corresponding to 95.8% purity. This example has proven that ammoniumtetraborate must be the first intermediate of my invention which then readily rearranges into ammoniumtriborate.

EXAMPLE 1A

Into a stirred suspension of 582.7 g (2 mole) of borax ($Na_2B_4O_7.5H_2O$) in 2 liter methanol, 68 g (4 mole) ammonia and 128 g (2 mole) sulfurdioxide gases were simultaneously introduced within 16 minutes. The reactor was equipped with a thermometer, stirrer and a reflux condenser. The gas introduction was measured by rotameters. While the gases were introduced, the temperature of the reaction mixture rose to the boiling point. After the introduction of the gases, external heating was applied for maintaining gentle boiling for an additional 10–30 minutes. From the hot suspension, sodium sulfite was filtered off through a pressure filter system. The dried sodium sulfite weighed 240 g. Theoretical yield 243 g. The warm filtrate was believed to be composed by boron compounds: ammonium tetraborate, methylborate-ammonia adduct, ammoniumpentaborate and a small amount of ammonium sulfite. It has now been found that the warm filtrate was composed mainly of ammoniumtriborate, mixed with small amounts of ammoniumpentaborate, methylborate-ammonia adduct, and ammoniumsulfite. This methanolic solution is useful in a form of a spray for rendering fibers flame resistant as will be explained in Examples 3A, 6A and 7A.

EXAMPLE 2A

In a pressure vessel equipped with gas inlets, pressure gauge, thermometer well and stirrer, 1164 g (4 mole) borax ($Na_2B_4O_7.5H_2O$) was covered by 4.5 liters of methanol. Into the well-stirred reaction mixture, 136 g (8 mole) ammonia and 256 g (4 mole) sulfurdioxide gases were simultaneously introduced within 34 minutes. The gas flow was measured by rotameters. An exothermic reaction ensued and the reactor reached 10–12 lb pressure at 64° C. The mixture was stirred for an additional 10–30 minutes while the temperature cooled to about 60° C. Then the hot reaction mixture was filtered on a pressure filter. The filtrate (4700 ml) corresponded to a 17.6% (w/v) ammoniumpentaborate content when analyzed by thermometric titration. This yield represents a 95.8% boron value recovery from the borax used. The methanolic filtrate was applied as a spray for the fire retardation of cellulosic fiber as explained in Examples 3A, 6A and 7A. The dried filter cake of the above methanolic filtrate weighed 592.6 g. Theoretical yield for $Na_2SO_3.H_2O$ is 576.0 g. Yield 102.8%.

EXAMPLE 3A

A solution of methanol soluble (water insoluble) dye (0.1–0.25% w/v) was added to a warm methanolic solution of the ammonium borate comosition described in Examples 1A and 2A. The colored ammonium borate mixture while still warm was then sprayed onto the cellulosic fiber insulation material. The coloring dye monitors the homogeneity of the spraying technique and helps to identify the product. While the spraying was applied, the fiber was evenly tumbled and moved in a suitably constructed spray-mix and dry unit. During the process, methanol and excess ammonia is recovered and recycled. Using the above technology, cellulosic fiber was treated and resulted in a 7.4% ammoniumpentaborate (corresponds to 8.3% boric acid) and 1.0% ammoniumsulfite add-on. The sample exhibited the following test results: flame spread rating (FSR) 15, radiant flux panel test (RFP) 67 cm, and cigarette smoldering test (CST) 1.2%. Another sample of cellulosic fiber was sprayed with the methanolic ammonium borate mixture of Example 2A and, after drying and conditioning in a 50% humidity chamber, the ammoniumpentaborate content was determined by thermometric titration. Its ammonium pentaborate add-on was 9.9% (=11.2% boric acid add-on). The ammonium sulfite add-on was 0.8%. The test results of this fiber were as follows: FSR 17, RFP 53 cm, CST 0.8%. All corrosion tests conducted on steel, copper and aluminum test specimens resulted in no visual evidence of corrosion. These tests were conducted according to the U.S. Public Law 95-319, Part 43-FR-39564, effective Oct. 15, 1979.

EXAMPLE 4A 270.0 g ammoniumpentaborate ($NH_4.B_5O_8.4H_2O$) was dissolved into 1500 ml hot water resulting in an 18% (w/v) solution. 680 ml of this solution were sprayed onto 1000 g cellulosic fiber using the spray-mix and dry unit. The dry fiber was conditioned at 50% humidity and showed a 13.7% ammoniumpentaborate add-on. The sample did not pass the radiant heat panel test (104 cm), and had an FSR of 28 and CST value of 1.2%. This and other similar results proved the ammonium borate composition of Examples 1A and 2A is a significantly better flame retardant than ammoniumpentaborate when applied alone.

EXAMPLE 5A

Following the procedure of Example 4A, but substituting ammoniumpentaborate with ammoniumtetraborate [$(NH_4)_2.B_4O_7.4H_2O$], an 11.6% add-on the latter was achieved on cellulosic fiber. The sample failed the radiant heat panel test (104 cm), exhibited an FSR value of 25 and CST 2.0%. This is another proof for the excellence of the ammoniumborate composition of Examples 1A and 2A versus another of its single components, ammoniumtetraborate. Examples 4A and 5A clearly demonstrate the superiority of the ammoniumborates and ammoniumsulfite mixture (Example 2A) as flame retardant compositon when compared with its single components: ammoniumpentaborate or ammoniumtetraborate.

EXAMPLE 6A

A one-inch thick sample of cotton batting (5"×10"), weighing 94.5 g, was soaked in the methanolic solution of ammoniumborate composition of Example 2A. After curing the add-on of ammoniumborates was 10.1%. This sample was self-extinguishing and the cotton was barely charred around the lighted cigarette. No smoldering ensued.

EXAMPLE 7A

Cotton batting samples (12"×2"×½") were soaked in the methanolic ammoniumborate composition of Example 2A. After air drying and heat curing at 120° for 2 hours and equilibration in 50% humidity chamber, the sample showed a 9.1% add-on. The sample was tested according to the State of California Flame Retardance Standard Test requirements which are described in the Technical Information Bulletin No. 117, on May, 1971. The said Bulletin is entitled "Requirements, Test Procedure and Apparatus for Testing the Flame Retardancy of Filling Materials Used in Upholstered Furniture." The required average afterflame time, average afterglow time, the average main char length, and the maximum char length of this sample were within the allowed limits.

It is preferable to apply the flame retardant composition to the fiber to be treated just after preparation of the flame retardant composition. The reason for this is evident from Equations 1a–c supra. That is, the borates contained in the composition of the invention are in dynamic equilibrium which favors formation of ammoniumpentaborate. This equilibrium prevents the exact determination of the relative proportion of ammoniumtetraborate, methylborate-ammonia adduct and ammoniumpentaborate in the methanolic solution. Now it has been found that the warm methanolic filtrate was composed mainly of ammoniumtriborate, mixed with a small amount of ammoniumpentaborate, methylborate and ammonium sulfite.

As stated at the end of Example 1A, it has now been found that the warm filtrate was composed mainly of ammoniumtriborate, mixed with small amounts of ammoniumpentaborate, methylborate-ammonia adduct and ammoniumsulfite. This statement is true for all the foregoing A examples, i.e., 1A–7A.

It has been also determined that it is preferable to apply the composition to the fibers to be treated within a few hours from the time of its preparation.

The composition of the invention may be readily applied to the fibers using conventional techniques and equipment known to the art. The amount of composition to be added to fiber will depend upon the fiber and the degree of treatment required as well as the economics of the materials. These factors may be readily determined based upon the present exemplification. However, it has been determined that sufficient treatment is obtained with an add-on of 6–14%, on a dry weight basis, preferably from about 8–11%. This amount of add-on can readily be added to the fibers from the methanolic flame retardant composition which has a concentration of from 10–25% and preferably 18–21% of borates (w/v).

As set forth in the examples, a water insoluble methanol soluble dye is advantageously added to the composition. This provides a ready visual means for determining the extent and uniformity of treatment of the fibers. Any water insoluble organic soluble dye may be used. Such dyes include Intraplast yellow, Intraplast brilliant blue available from Crompton and Knolles of Reading, Pa., but other suitable dyes are commercially available.

The embodiments of the invention in which our exclusive property or privilege is claimed are defined as follows:

1. A process for flame retarding natural and synthetic fibers which are subject only to dry laundering, which comprises applying ammoniumtriborate or a solution of ammoniumtriborate to natural fibers, synthetic fibers or mixtures thereof in sufficient quantity to provide a flame retarding amount of borates on said fibers.

2. The process of claim 1 wherein the fibers are in the form of cotton batting, furniture padding, upholstery or carpeting.

3. The process of claim 2 wherein the base materials are cellulosic, polyesters, polyurethanes, nylons or polyolefins.

4. The process of claim 2 wherein the said composition is applied by soaking-pressing or spraying followed by heat curing the fibers.

5. Flame retarded fibers prepared by the process of claim 1.

6. The process of claim 1 wherein a hot methanolic solution of ammoniumtriborate or a hot water solution of ammoniumtriborate is applied to the fiber by means of spraying and wherein methanol and ammonia is removed when a methanolic solution is used and water and ammonia is removed when a water solution is used.

7. A process for rendering flame resistant products manufactured from virgin, processed, reconstituted, or recycled organic materials or fibers, such as newsprints, wood chips, wood shavings, sawdust, wood panels, corn cobs, bagasse, peanut shells, and other dried plant matter which comprises applying to said materials or fibers a solution containing ammoniumtriborate.

8. The process of claim 7 wherein the solution is a methanolic solution.

9. The process of claim 7 wherein the solution comprises a water-methanol solution of ammoniumtriborate, ammoniumpentaborate and an inorganic or organic sulfite.

10. The process of claim 7 wherein the solution is a hot water solution which comprises ammoniumtriborate, ammoniumpentaborate and an inorganic or organic sulfite.

11. The process of claim 10 wherein the ammoniumtriborate-ammoniumpentaborate concentration is from 5 to 60% and the inorganic or organic sulfite concentration is from 1 to 5%.

12. A process for rendering flame resistant products manufactured from virgin, processed, reconstituted, or recycled organic materials or fibers, such as newsprints, wood chips, wood shavings, saw dust, wood panels, corn cobs, bagasse, peanut shells, and other dried plant matter which comprises applying to said materials or fibers an anhydrous methanolic solution containing a flame retardant effective amount of methylborateammonia adduct.

13. Flame retardant fibers which are subject only to dry laundering and which contain ammoniumtriborate wherein said fibers are made by incorporating ammoniumtriborate in situ to produce ammoniumpentaborate.

* * * * *